US012614991B2

(12) United States Patent
Nawaz

(10) Patent No.: US 12,614,991 B2
(45) Date of Patent: Apr. 28, 2026

(54) BRIDGE INVERTERS FOR WIRELESS CHARGING

(71) Applicant: Molex, LLC, Lisle, IL (US)

(72) Inventor: Bazil Nawaz, Warrenville, IL (US)

(73) Assignee: Molex, LLC, Lisle, IL (US)

( * ) Notice: Subject to any disclaimer, the term of this patent is extended or adjusted under 35 U.S.C. 154(b) by 190 days.

(21) Appl. No.: 18/439,777

(22) Filed: Feb. 13, 2024

(65) Prior Publication Data

US 2024/0291395 A1      Aug. 29, 2024

Related U.S. Application Data

(60) Provisional application No. 63/447,899, filed on Feb. 24, 2023.

(51) Int. Cl.
  *H02M 1/00* (2007.01)
  *H02J 50/12* (2016.01)
  *H02M 1/088* (2006.01)
  *H02M 7/48* (2007.01)
  (Continued)

(52) U.S. Cl.
  CPC ....... *H02M 7/4815* (2021.05); *H02M 1/0058* (2021.05); *H02M 1/088* (2013.01); *H02M 7/53871* (2013.01); *H02J 50/12* (2016.02)

(58) Field of Classification Search
  CPC ............. H02J 50/12; H02M 1/08–088; H02M 7/4816; H02M 7/53871
  See application file for complete search history.

(56) References Cited

U.S. PATENT DOCUMENTS 6,020,688 A * 2/2000 Moisin ................ H02M 7/5383
                                                    315/307
8,922,131 B1 * 12/2014 Xiong ................ H05B 41/2827
                                                    315/246
9,276,413 B1 * 3/2016 Zhang ..................... H02J 50/12
          (Continued)

FOREIGN PATENT DOCUMENTS

CN        108321943 A      7/2018
CN        119134862 A * 12/2024 .............. H02J 50/12

OTHER PUBLICATIONS

Bury Technologies, "Wireless charging—Universal and easy charging", Future Solutions for Automotive, 2024, 2 pages.
          (Continued)

*Primary Examiner* — Sisay G Tiku

(57) ABSTRACT

Exemplary embodiments are disclosed of bridge inverters for wireless charging. In an exemplary embodiment, a bridge inverter circuit includes a bridge driver and first and second transistors (e.g., metal-oxide-semiconductor field-effect transistors (MOSFETs), etc.) coupled with the bridge driver. First and second power inductors are respectively coupled with the first and second transistors. A resonant tank is coupled with the first and second transistors and the first and second power inductors. The bridge inverter circuit may include only one bridge driver and only two transistors. The first and second power inductors may be located before the bridge inverter stage such that the first and second power inductors are in the DC domain rather than the AC domain. The resonant tank may include at least one additional inductor-capacitor (LC) component. The bridge inverter circuit may be configured to be operable for producing half sine waves for each half cycle.

18 Claims, 4 Drawing Sheets

(51) Int. Cl.
    *H02M 7/538*     (2007.01)
    *H02M 7/5387*    (2007.01)

(56)            References Cited

U.S. PATENT DOCUMENTS

| | | | | |
|---|---|---|---|---|
| 10,315,526 | B2 * | 6/2019 | van Boheemen | H02J 50/80 |
| 2017/0302086 | A1 * | 10/2017 | Kwan | H02J 50/20 |
| 2017/0324277 | A1 * | 11/2017 | Mitcheson | H02J 50/12 |
| 2018/0034381 | A1 * | 2/2018 | Aldhaher | H02M 7/06 |
| 2018/0205265 | A1 * | 7/2018 | Park | H02J 50/12 |
| 2018/0212463 | A1 * | 7/2018 | van Boheemen | H02J 50/80 |
| 2018/0375380 | A1 * | 12/2018 | Liu | H02J 50/12 |
| 2019/0326786 | A1 | 10/2019 | Kim | |
| 2021/0099030 | A1 | 4/2021 | Walton | |
| 2021/0175728 | A1 * | 6/2021 | Wang | H02J 7/04 |
| 2022/0060057 | A1 * | 2/2022 | Hao | H02J 50/005 |
| 2022/0255357 | A1 | 8/2022 | Aldhaher | |
| 2024/0006920 | A1 * | 1/2024 | Cao | H02J 50/60 |
| 2024/0213813 | A1 * | 6/2024 | Arsenault | H02J 50/12 |
| 2025/0192615 | A1 * | 6/2025 | Gu | H02M 3/07 |

OTHER PUBLICATIONS

NXP, "Automotive Multi-Coil Wireless Charging Transmitter", RDWCT-15WTXAUTO, 2024, 6 pages.
Spark Connected, "The Beast", Automotive in-cabin Wireless Charging transmitter, 2024, 3 pages.
Wu, Charlie, "Wireless Charging Solutions: Design of Wireless Charging", AMF-SMC-T3030, NXP, May 2018, 48 pages.

* cited by examiner

BRIDGE INVERTERS FOR WIRELESS CHARGING

RELATED APPLICATION

This application claims priority to U.S. Provisional Application No. 63/447,899 filed Feb. 24, 2023, which is incorporated herein by reference in its entirety.

TECHNICAL FIELD

This disclosure generally relates to bridge inverters for wireless charging.

DESCRIPTION OF RELATED ART

Inductive power transfer and wireless charging has seen significant growth in consumer electronics, automotive vehicles, industrial devices, biomedical implants, and home appliances over the past decade. A general inductive power transfer system includes a power source, inverter, resonant tank, rectifier, and load. But designing a complete inductive power transfer system (IPTS) is challenging due to various possible constraints (e.g., cost, efficiency, size, weight, safety, temperature, etc.).

SUMMARY

This section provides a general summary of the disclosure and is not a comprehensive disclosure of its full scope or all of its features.

Exemplary embodiments are disclosed of bridge inverters for wireless charging. In an exemplary embodiment, a bridge inverter circuit includes a bridge driver and first and second transistors (e.g., metal-oxide-semiconductor field-effect transistors (MOSFETs), etc.) coupled with the bridge driver. First and second power inductors are respectively coupled with the first and second transistors. A resonant tank is coupled with the first and second transistors and the first and second power inductors.

In exemplary embodiments, the bridge inverter circuit may include only one bridge driver and only two transistors. The first and second power inductors may be located before the bridge inverter stage such that the first and second power inductors are in the DC domain rather than the AC domain. The resonant tank may include at least one additional inductor-capacitor (LC) component. And the bridge inverter circuit may be configured to be operable for producing half sine waves for each half cycle.

Further areas of applicability will become apparent from the description provided herein. The description and specific examples in this summary are intended for purposes of illustration only and are not intended to limit the scope of the present disclosure.

DRAWINGS

The present application is illustrated by way of example and not limited in the accompanying figures in which like reference numerals indicate similar elements and in which.

DETAILED DESCRIPTION

The detailed description that follows describes exemplary embodiments and the features disclosed are not intended to be limited to the expressly disclosed combination(s). Therefore, unless otherwise noted, features disclosed herein may be combined together to form additional combinations that were not otherwise shown for purposes of brevity.

As recognized herein, conventional bridge inverter designs may not be suitable in all cases due to deficient performance in terms of efficiency, charging time, thermal behavior, electromagnetic compatibility (EMC), and higher costs with their filtered full inverter bridge designs. Accordingly, exemplary embodiments of bridge inverter circuits were developed and/or are disclosed herein that may provide or include one or more (but not necessarily any or all) of the following advantages or features:

Improved EMC by producing half sine-waves for each half cycle as compared to a square wave produced by conventional full inverter bridge device;

Reduced (e.g., halved, etc.) part count and cost improvement due to less (e.g., one-half of, etc.) bridge components being used;

Improved EMC behavior provided by an additional LC filter at the resonant tank; and Improved efficiency and thermal performance that leads to better charging times by placing power inductors placed in the DC domain rather than the AC domain such that only DC losses are prevalent with minimal eddy current and hysteresis losses.

Figure 1:
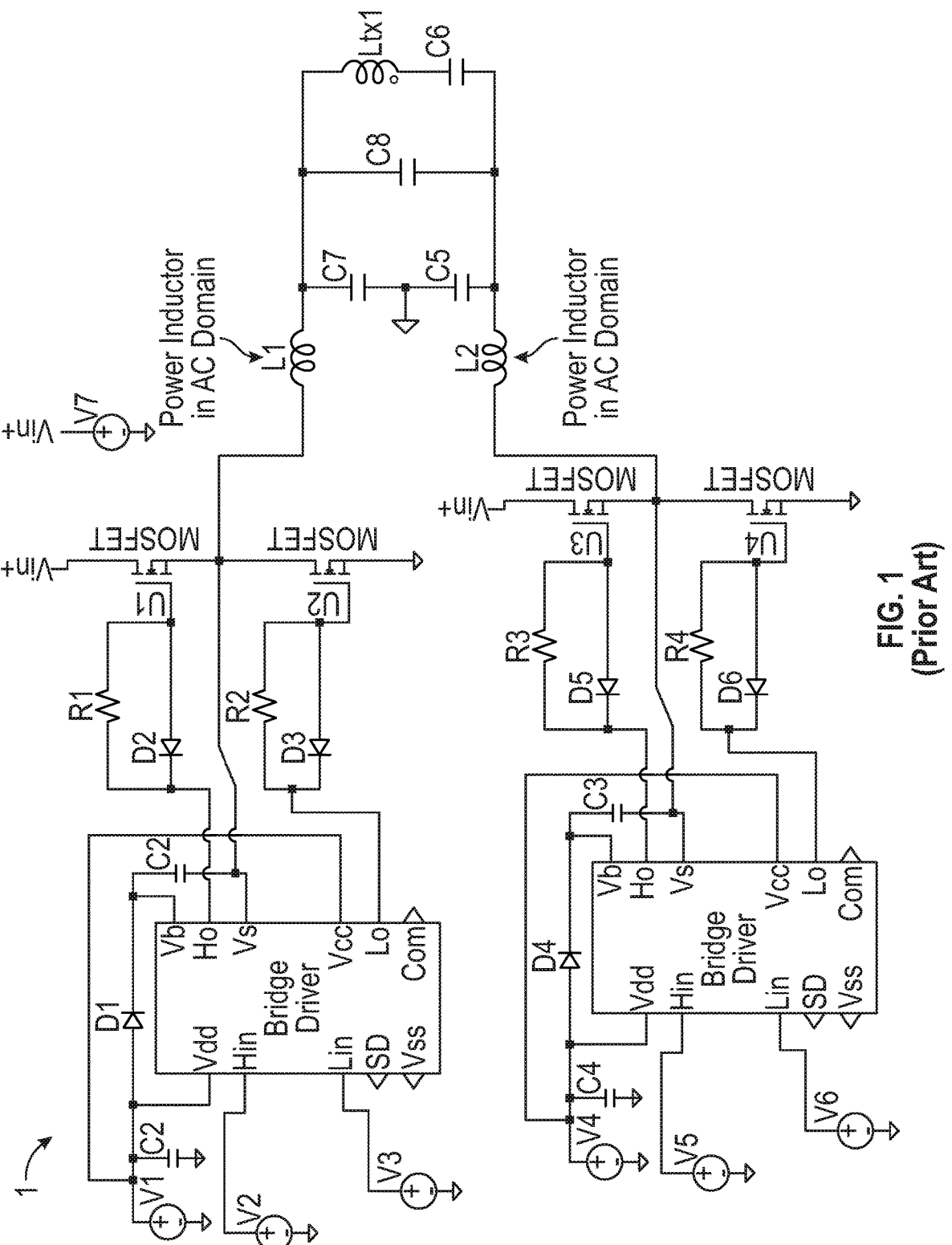
FIG. 1 is a circuit diagram illustrating a conventional bridge inverter circuit for wireless charging.

FIG. 1 illustrates a conventional bridge inverter circuit 1 for wireless charging. The bridge inverter circuit 1 includes four metal-oxide-semiconductor field-effect transistors (MOSFETs), two bridge drivers, multiple ceramic COG capacitors C1 to C8, and two power inductors L1 and L2. The power inductors L1 and L2 are located after the bridge inverter stage such that the power inductors L1 and L2 are in the AC domain. In operation, the bridge inverter circuit 1 produces a square wave due to its full bridge inverter and filter placement. As recognized herein, however, the power inductors L1 and L2 in the AC domain will experience high AC losses in the inductor magnetics due to eddy current and hysteresis losses. Accordingly, exemplary embodiments of bridge inverter circuits were developed and/or are disclosed herein in which the L filter stage (e.g., L1 and L2 in FIG. 3, etc.) has been moved before the MOSFET stage to lower AC losses such that only DC losses are prominent. This, in turn, can improve efficiency and thermal performance that leads to better charging times.

In exemplary embodiments disclosed herein, the bridge inverter circuit includes an extra LC component (e.g., L3 and C8 in FIG. 3, etc.) at the resonant tank. With the extra LC component at the resonant tank, a better frequency response of the wireless transfer system is achievable that can result in lower high order harmonic distortion. In turn, the lower high order harmonic distortion can provide better or improved electromagnetic compatibility (EMC) behavior and improved EMC.

Also, the conventional bridge inverter circuit 1 shown in FIG. 1 includes four MOSFETs, two bridge drivers, and up to eleven COG capacitors. In exemplary embodiments disclosed herein, the bridge inverter circuit (e.g., circuit 200 in FIG. 3, etc.) includes two MOSFETs, one bridge driver, and a reduced number of capacitors (e.g., six, seven, or eight capacitors, etc.), which thus lowers part count and costs as compared to the higher costs associated with the conventional full bridge inverter designs.

Conventional bridge inverter designs (e.g., bridge inverter 1 in FIG. 1, etc.) produce square waves due to their full bridge inverters and filter placement. In exemplary embodiments disclosed herein, the bridge inverter circuit is configured to be operable for producing half sine waves during each half cycle, which can improve EMC as compared to the conventional bridge inverter designs that produce square waves.

Figure 2:
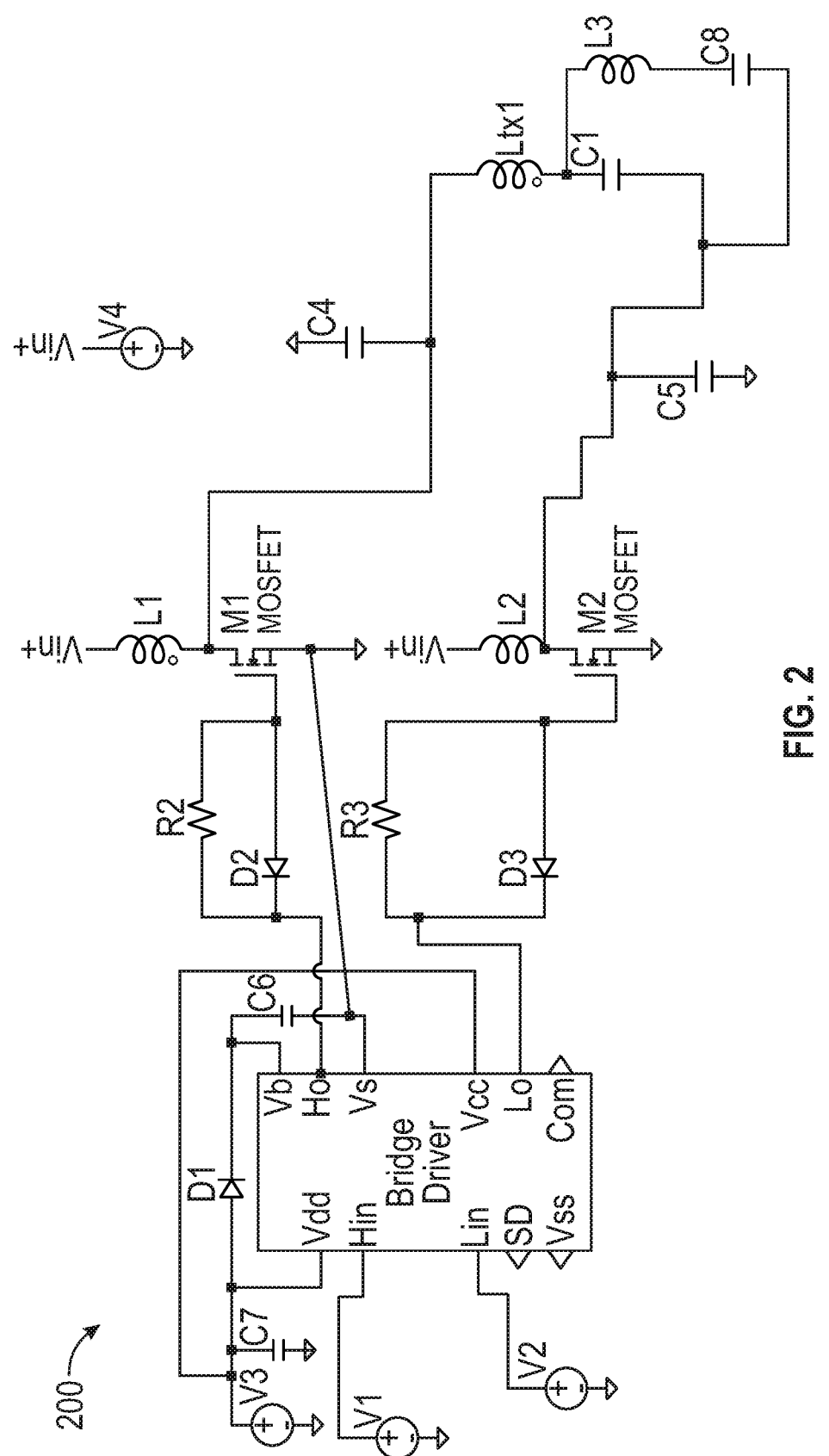
FIGS. 2 and 3 are circuit diagrams illustrating a bridge inverter circuit for wireless charging according to an exemplary embodiment of the present disclosure.
Figure 3:
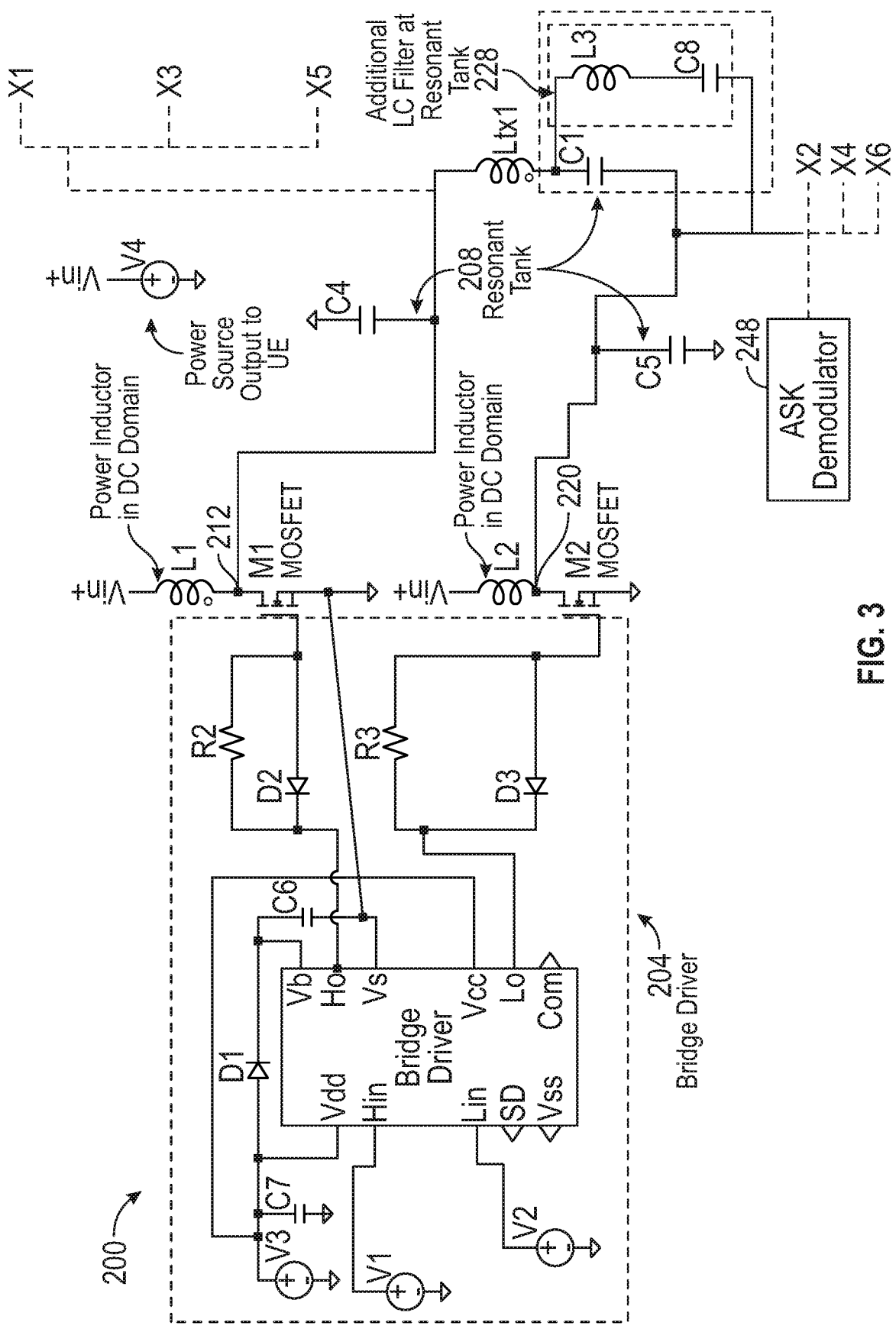

FIGS. 2 and 3 illustrate a bridge inverter circuit 200 for wireless charging according to an exemplary embodiment of the present disclosure. Generally, the bridge inverter circuit 200 includes diodes D1 to D3, resistors (broadly, resistances) R2 and R3, capacitors C1 and C4 through C8, inductors L1 to L3, MOSFETs M1 and M2 (broadly, transistors), bridge driver, and transmitter coil Ltx1, which define and/or are part of the various components of the bridge inverter circuit 200 as disclosed herein.

In this exemplary embodiment, the bridge inverter circuit 200 includes only one bridge driver 204 and only two MOSFETs M1 and M2. With only one bridge driver 204 and two MOSFETs M1 and M2, this exemplary embodiment allows for a considerable cost improvement as compared to the conventional inverter bridge circuit 1 (FIG. 1), which includes two bridge drivers and four MOSFETs.

With continued reference to FIG. 3, the bridge inverter circuit 200 includes first and second power inductors L1 and L2 located before the MOSFET stage such that the power inductors L1 and L2 are in the DC domain. The placement of the power inductors L1 and L2 in the DC domain rather than the AC domain lowers the AC losses such that only DC losses are prevalent with minimal eddy current and hysteresis losses. Advantageously, this will improve efficiency and thermal performance leading to better charging times.

The bridge inverter circuit 200 includes a resonant tank 208. The resonant tank 208 includes at least one capacitor C4 coupled in series with the first MOSFET M1 and the first power inductor L1. A first node 212 is defined between the first MOSFET M1, the first power inductor L1, and the capacitor C4. Although FIG. 3 illustrates a single capacitor C4, other exemplary embodiments may be configured differently, e.g., the single capacitor C4 may be replaced with multiple capacitors in parallel.

The resonant tank 208 also includes at least one capacitor C5 coupled in series with the second MOSFET M2 and the second power inductor L2. A second node 220 is defined between the second MOSFET M2, the second power inductor L2, and capacitor C5. Although FIG. 3 illustrates a single capacitor C5, other exemplary embodiments may be configured differently, e.g., the single capacitor C5 may be replaced with multiple capacitors in parallel.

The resonant tank 208 further includes a capacitor C1. The capacitor C1 may be a single capacitor or multiple capacitors in parallel. The resonant tank 208 further includes an additional LC filter 228 comprising inductor L3 and capacitor C8. The inductor L3 and capacitor C8 are coupled in series with capacitor C1. With the extra LC component L3 and C8 at the resonant tank 208, a better frequency response of the wireless transfer system is achievable that can result in lower high order harmonic distortion. In turn, the lower high order harmonic distortion can provide better or improved electromagnetic compatibility (EMC) behavior and improved EMC.

The bridge inverter circuit 200 further includes resistor R2 and diode D2 in parallel that are coupled with the first MOSFET M1 for a slow turn on and fast turn off. The resistor R2 and diode D2 may be used to control the rise and fall time of the first MOSFET M1. The bridge inverter circuit 200 further includes resistor R3 and diode D3 in parallel that are coupled with the second MOSFET M2 for a slow turn on and fast turn off. The resistor R3 and diode D3 may be used to control the rise and fall time of the second MOSFET M2.

FIG. 3 also illustrates a transmitter coil Ltx1 and coil connections X1, X2, X3, X4, X5, X6. By way of example, the transmitter coil Ltx1 may represent a single transmitter coil configuration in which one side of the transmitter coil Ltx1 is connected to X1, X3, or X5 and the other side of the transmitter coil Ltx1 is connected to X2, X4, or X6. By way of further example, the transmitter coil Ltx1 may represent a multiple coil configuration, such as a 3-coil configuration for coil connections X1 to X6, etc.

FIG. 3 also shows an ASK (amplitude key shifting) demodulator 248 coupled with the bridge inverter circuit 200. Generally, the ASK demodulator 248 may be an electronic circuit or a computer program in a software-defined radio (SDR) that is used to recover information content from a modulated carrier wave.

Figure 4:
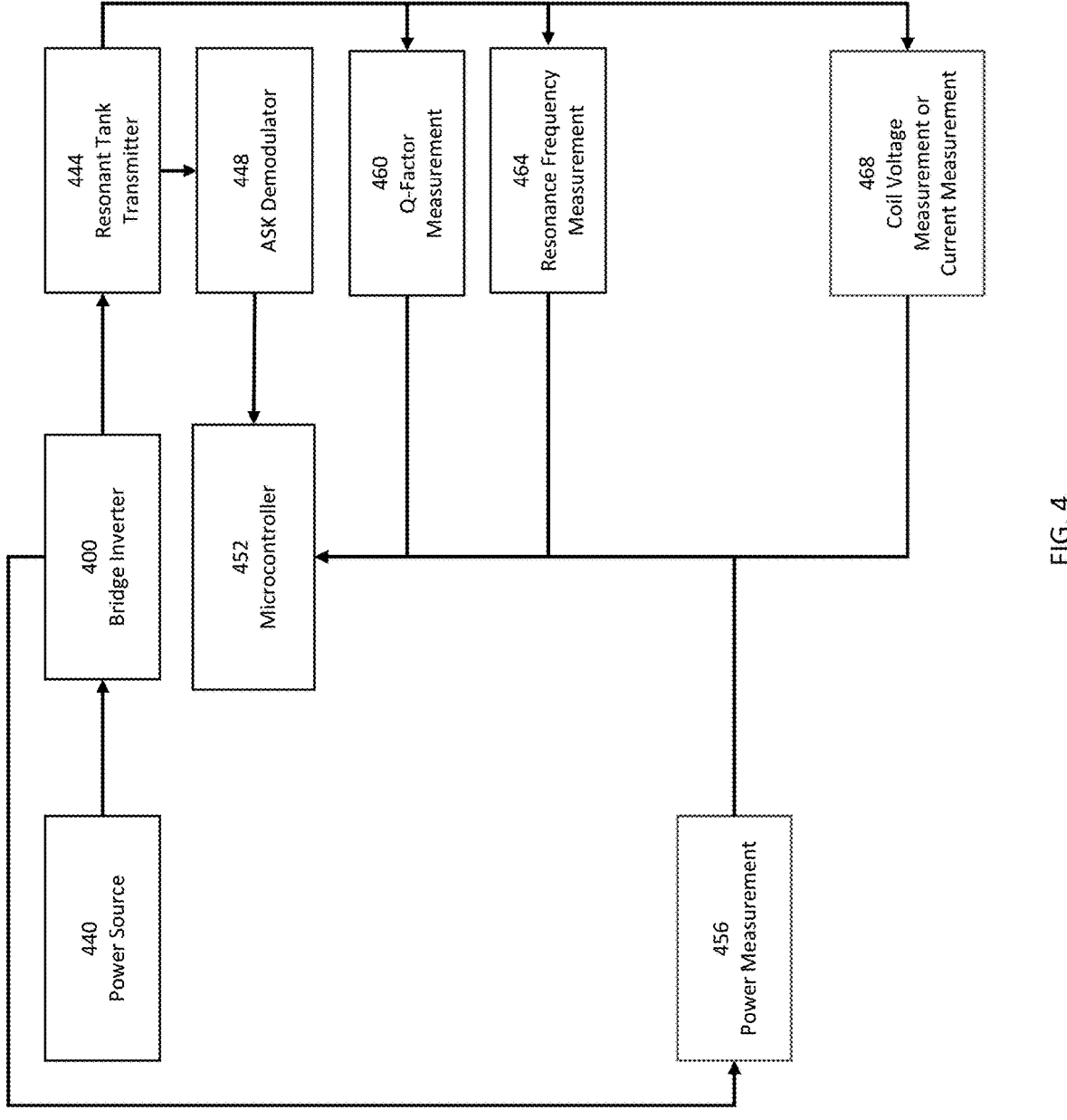
FIG. 4 is a block diagram illustrating an example of a wireless power transfer system at the transmitter side that includes a bridge inverter according to an exemplary embodiment of the present disclosure.

FIG. 4 is a block diagram illustrating an example of a wireless power transfer system at the transmitter side that includes a bridge inverter 400 according to an exemplary embodiment of the present disclosure. As shown, the wireless power transfer system further includes a power source 440, resonant tank transmitter 444, ASK (amplitude key shifting) demodulator 448, microcontroller 452 (broadly, a controller or control unit), power measurement 456, Q-factor measurement 460, resonance frequency measurement 464, and coil voltage measurement or current measurement 468.

The bridge inverter 400 is coupled with and between the power source 440, resonant tank transmitter 744, and power measurement 456. The ASK demodulator 448 is coupled with the resonant tank transmitter 444. The ASK demodulator 448 is coupled with and/or includes the microcontroller 452.

The power measurement 456 is coupled with and between the bridge inverter 400 and the microcontroller 452. The Q-factor measurement 460 is coupled with and between the resonant tank transmitter 444 and the microcontroller 452. The resonance frequency measurement 464 is coupled with and between the resonant tank transmitter 444 and the microcontroller 452. The coil voltage measurement or current measurement 468 is coupled with and between the resonant tank transmitter 444 and the microcontroller 452.

The bridge inverter 400 may include components (e.g., single bridge driver, two MOSFETs, power inductors in the DC domain, resonant tank with extra LC filter, etc.) identical or substantially similar to the components as disclosed herein for bridge inverter circuit 200 (FIGS. 2 and 3). For brevity, the components of the bridge inverter 400 will therefore not be described in detail.

Although FIG. 4 illustrates the bridge inverter 400 being used in a wireless power transfer system at the transmitter side, the bridge inverter circuits disclosed herein should not be limited to use with only wireless power transfer system at the transmitter side. The bridge inverter circuits disclosed herein may be used in various applications, including wireless power transfer devices and applications (e.g., devices that wirelessly transmit power or receive wireless power, etc.), wireless charging devices (e.g., automotive wireless chargers, other wireless power chargers, etc.), transformers, devices to be charged (e.g., smartphones, tablets, other electronic devices, other user equipment (UE) in a vehicle, etc.), etc. Accordingly, the bridge inverter circuits disclosed herein should not be limited to use with any one particular type of application, end use, device to charged, wireless charger, wireless power transfer device, transformer, etc.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

I claim:

1. A bridge inverter circuit for wireless charging comprising:
   a first transistor and a second transistor coupled with a bridge driver; and
   a first power inductor and a second power inductor respectively coupled with the first transistor and the second transistor; and
   a resonant tank coupled with the first transistor and the second transistor and the first power inductor and the second power inductor;
   wherein
   the resonant tank includes:
      a first inductor-capacitor (LC) component and at least one additional inductor-capacitor (LC) component;
      at least one capacitor coupled in series with the first transistor, the first power inductor, and the at least one additional inductor-capacitor (LC) component; and
      at least one capacitor coupled in series with the second transistor, the second power inductor, and the at least one additional inductor-capacitor (LC) component.

2. The bridge inverter circuit of claim 1, wherein the bridge inverter circuit consists of only one of the bridge driver.

3. The bridge inverter circuit of claim 1, wherein the bridge inverter circuit consists of only two of the transistors.

4. The bridge inverter circuit of claim 1, wherein the first power inductor and the second power inductor are located before the bridge inverter stage such that the first power inductor and the second power inductor are in a direct current (DC) domain.

5. The bridge inverter circuit of claim 1, wherein the bridge inverter circuit is configured to be operable for producing half sine waves for each half cycle.

6. The bridge inverter circuit of claim 1, wherein the first and second power inductors are located in a direct current (DC) domain rather than an alternating current (AC) domain such that only DC losses are prevalent with minimal eddy current and hysteresis losses.

7. The bridge inverter circuit of claim 1, wherein the first transistor and the second transistor are first and second metal-oxide-semiconductor field-effect transistors (MOSFETs), respectively.

8. The bridge inverter circuit of claim 7, wherein the bridge inverter circuit consists of only the first and second MOSFETs.

9. The bridge inverter circuit of claim 7, wherein the first power inductor and the second power inductor are respectively coupled with the first and second MOSFETs such that the first power inductor and the second power inductor are located before a MOSFET stage and in a direct current (DC) domain rather than an alternating current (AC) domain whereby only DC losses are prevalent with minimal eddy current and hysteresis losses.

10. The bridge inverter circuit of claim 9, wherein the bridge inverter circuit consists of only the first and second MOSFETs.

11. The bridge inverter circuit of claim 1, wherein the bridge inverter circuit is configured to have at least two of the following:
   the bridge inverter circuit consists of only one of the bridge driver; and/or
   the bridge inverter circuit consists of only two transistors, the first transistor and the second transistor; and/or
   the first power inductor and the second power inductor are located before the bridge inverter stage such that the first power inductor and the second power inductor are in a direct current (DC) domain; and/or
   the bridge inverter circuit is configured to be operable for producing half sine waves for each half cycle.

12. The bridge inverter circuit of claim 1, wherein the bridge inverter circuit is configured to have at least three of the following:
   the bridge inverter circuit consists of only one of the bridge driver; and/or
   the bridge inverter circuit consists of only two transistors, the first transistor and the second transistor; and/or
   the first power inductor and the second power inductor are located before the bridge inverter stage such that the first power inductor and the second power inductor are in a direct current (DC) domain; and/or
   the bridge inverter circuit is configured to be operable for producing half sine waves for each half cycle.

13. The bridge inverter circuit of claim 1, wherein the bridge inverter circuit is configured to have at least four of the following:
   the bridge inverter circuit consists of only one of the bridge driver; and/or
   the bridge inverter circuit consists of only two transistors, the first transistor and the second transistor; and/or
   the first power inductor and the second power inductor are located before the bridge inverter stage such that the first power inductor and the second power inductor are in a direct current (DC) domain; and/or
   the bridge inverter circuit is configured to be operable for producing half sine waves for each half cycle.

14. The bridge inverter circuit of claim 1, wherein:
   the bridge inverter circuit consists of only one of the bridge driver; and/or
   the bridge inverter circuit consists of only two transistors, the first transistor and the second transistor; and/or
   the first power inductor and the second power inductor are located before the bridge inverter stage such that the first power inductor and the second power inductor are in a direct current (DC) domain; and/or
   the bridge inverter circuit is configured to be operable for producing half sine waves for each half cycle.

15. A wireless power transfer system comprising at least one transmitter coil coupled with the bridge inverter circuit of claim 1.

16. A wireless charging module comprising a housing that defines an enclosure, at least one inductive charging coil within the housing, and the bridge inverter circuit of claim 1 within the housing and coupled with the at least one inductive charging coil, wherein the at least one inductive charging coil is configured to be operable for transferring power wirelessly through a charging surface of the wireless charging module.

17. A wireless power transfer system comprising a resonant tank transmitter, a power source, and the bridge inverter circuit of claim 1 coupled with and between the power source and the resonant tank transmitter.

18. The wireless power transfer system of claim 17, further comprising an amplitude key shifting (ASK) demodulator, a microcontroller, a power measurement, a Q-factor measurement, a resonance frequency measurement, and a coil voltage measurement or current measurement, wherein:

the ASK demodulator is coupled with the resonant tank transmitter;

the ASK demodulator is coupled with and/or includes the microcontroller;

the power measurement is coupled with and between the bridge inverter circuit and the microcontroller;

the Q-factor measurement is coupled with and between the resonant tank transmitter and the microcontroller;

the resonance frequency measurement is coupled with and between the resonant tank transmitter and the microcontroller; and the coil voltage measurement or current measurement is coupled with and between the resonant tank transmitter and the microcontroller.

* * * * *